US010555046B2

(12) United States Patent
Prasad

(10) Patent No.: US 10,555,046 B2
(45) Date of Patent: Feb. 4, 2020

(54) BROADCASTING, MULTICASTING, OR UNICASTING ADVERTISING CONTENT BASED ON USER CONTEXT

(71) Applicant: Athul Prasad, Helsinki (FI)

(72) Inventor: Athul Prasad, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/664,822

(22) Filed: Jul. 31, 2017

(65) Prior Publication Data

US 2018/0199115 A1   Jul. 12, 2018

Related U.S. Application Data

(63) Continuation-in-part of application No. PCT/IB2017/050096, filed on Jan. 9, 2017.

(51) Int. Cl.
*H04N 21/64* (2011.01)
*H04L 12/26* (2006.01)
(Continued)

(52) U.S. Cl.
CPC .......... *H04N 21/64* (2013.01); *H04L 43/028* (2013.01); *H04N 21/2223* (2013.01);
(Continued)

(58) Field of Classification Search
CPC ....... H04N 21/23424; H04N 21/25883; H04N 21/2668; H04N 21/812; H04N 21/2365;
(Continued)

(56) References Cited

U.S. PATENT DOCUMENTS 8,155,628 B1    4/2012   Sennett et al.
8,331,982 B2   12/2012   Hong et al.
(Continued)

FOREIGN PATENT DOCUMENTS

WO   2004088985 A1   10/2004

OTHER PUBLICATIONS

Prasad, A., et al., "Enabling Group Communication for Public Safety in LTE-Advanced Networks", Journal of Computer and Network Applications, Oct. 1, 2014, 32 pages.
(Continued)

*Primary Examiner* — Hai V Tran

(57) ABSTRACT

A network gateway provides first content in a first service flow associated with a user equipment. The network gateway also accesses a user context for the user equipment. The user context is generated based on user-specific information included in packets received from the user equipment. The network gateway transmits the second content to the user equipment in a second service flow via a transmission mode that is selected from one of a broadcast mode, a multicast mode, or unicast mode. The broadcast mode, multicast mode, or unicast mode is selected based on a user context for the user equipment. The user equipment receives the first content in the first service flow and the second content in the second service flow that is selectively broadcast, multicast, or unicast based on the user context. The user equipment combines the first content and the second content for display.

28 Claims, 11 Drawing Sheets

(51) Int. Cl.
*H04N 21/81* (2011.01)
*H04N 21/222* (2011.01)
*H04N 21/258* (2011.01)
*H04N 21/647* (2011.01)
*H04N 21/262* (2011.01)
*H04N 21/234* (2011.01)

(52) U.S. Cl.
CPC . *H04N 21/23424* (2013.01); *H04N 21/25841* (2013.01); *H04N 21/26241* (2013.01); *H04N 21/64707* (2013.01); *H04N 21/812* (2013.01)

(58) Field of Classification Search
CPC ......... H04N 21/25891; H04N 21/4126; H04N 21/4347; H04N 21/44016; H04N 21/4532; H04N 21/6131; G06F 21/6254; G06F 2221/2111
See application file for complete search history.

(56) References Cited

U.S. PATENT DOCUMENTS

| | | | |
|---|---|---|---|
| 9,380,079 B2 | 6/2016 | White et al. | |
| 2006/0107302 A1* | 5/2006 | Zdepski | H04N 21/23424 725/135 |
| 2007/0127478 A1 | 6/2007 | Jokela et al. | |
| 2009/0104871 A1 | 4/2009 | Cho | |
| 2010/0023338 A1 | 1/2010 | Petronelli et al. | |
| 2010/0034089 A1* | 2/2010 | Kovvali | H04L 67/2842 370/235 |
| 2010/0122288 A1 | 5/2010 | Minter et al. | |
| 2010/0195558 A1* | 8/2010 | Koskinen | H04L 41/5019 370/312 |
| 2010/0235877 A1* | 9/2010 | Hu | H04L 63/0227 726/1 |
| 2012/0230240 A1 | 9/2012 | Nebat et al. | |
| 2012/0257015 A1 | 10/2012 | Kim et al. | |
| 2013/0111520 A1* | 5/2013 | Lo | H04N 21/25841 725/35 |
| 2014/0052680 A1* | 2/2014 | Nitz | G06N 5/02 706/46 |
| 2014/0254456 A1 | 9/2014 | Roh | |
| 2016/0012252 A1* | 1/2016 | Deleeuw | G06F 21/6254 726/26 |
| 2016/0127801 A1* | 5/2016 | Baldwin | H04N 21/812 725/34 |
| 2017/0164161 A1* | 6/2017 | Gupta | H04W 4/06 |

OTHER PUBLICATIONS

Fitzgerald, D., "AT&T Chief Outlines Plans for Running Time Warner—WSJ", <http://www.foxbusiness.com/features/2017/05/24/at-t-chief-outlines-plans-for-running-time-warner-wsj.html>, Accessed Oct. 4, 2017, 3 pages.

"Feasible Study on Enhancement of LTE for Efficient delivery Video/High Definition", 3GPP TSG-SA WG1 Meeting #75, Aug. 22-26, 2016, 4 pages.

PCT Patent Application No. PCT/IB2017/050096 filed Jan. 9, 2017, listing Athul Prasad et al. as inventors, entitled "Method and Apparatus for Oordinated Content Delivery in Multicast / Broadcast Networks".

International Search Report and Written Opinion dated Oct. 18, 2018 for PCT/US18/044640, 14 pages.

\* cited by examiner

BROADCASTING, MULTICASTING, OR UNICASTING ADVERTISING CONTENT BASED ON USER CONTEXT

CROSS-REFERENCE TO RELATED APPLICATIONS

This application is a continuation-in-part of PCT Application No. PCT/IB2017/050096, entitled "METHOD AND APPARATUS FOR COORDINATED CONTENT DELIVERY IN MULTICAST/BROADCAST NETWORKS," which was filed Jan. 9, 2017 and is incorporated herein by reference in its entirety.

BACKGROUND

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. Future 5G communication systems will therefore be required to support gigabit per second data rates (e.g., to support virtual or augmented reality applications), end-to-end latencies of at most 10 milliseconds (ms) (e.g., to support factory automation applications), reliabilities of at least 99.999% (e.g., for automotive traffic control applications such as platooning), and user equipment densities of tens of millions of devices per square kilometer (e.g., to support cellular IoT applications). Communication systems that operate according to the 5G standards are also expected to provide wireless access and fixed (or wired) access on an equal footing, which is referred to herein as fixed-mobile convergence. User equipment will therefore be able to perform hybrid access by connecting to the 5G communication system via concurrent fixed and wireless connections.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for selectively broadcasting, multicasting, or unicasting content. The method includes providing, from a network gateway, first content in a first service flow associated with a user equipment. The method also includes accessing a user context for the user equipment. The user context is generated based on user-specific information included in packets received from the user equipment. The method further includes transmitting second content via a selected transmission mode in a second service flow to the user equipment for combination with the first content, The selected transmission mode is selected from one of a broadcast mode, a multicast mode, or unicast mode based on a user context for the user equipment.

In some embodiments, providing the first content in the first service flow includes broadcasting or multicasting the first content to a plurality of user equipment that includes the user equipment.

In some embodiments, the method includes interrupting provision of the first content in the first service flow for a predetermined time interval, and transmitting the second content includes transmitting the second content during the predetermined time interval via the selected transmission mode.

In some embodiments, transmitting the second content includes transmitting the second content in the second service flow concurrently with providing the first content in the first service flow.

In some embodiments, transmitting the second content via the selected transmission mode includes at least one of unicasting user-specific content to the user equipment, multicasting a second advertisement to a subset of a plurality of user equipment, and broadcasting a third advertisement to the plurality of user equipment.

In some embodiments, the method also includes selecting the second content from a set of content streams based on the user context.

In some embodiments, the method also includes performing deep packet inspection on the packets received from the user equipment and generating the user context based on the results of the deep packet inspection.

In some embodiments, generating the user context includes generating the user context based on spatial or temporal information associated with the user equipment.

In some embodiments, the method also includes anonymizing the user context and providing the anonymized user context to a third party.

In some embodiments, a method is provided for receiving content that is selectively broadcast, multicast, or unicast. The method includes receiving, at a receiver of a user equipment, first content in a first service flow. The method also includes receiving, at the receiver of the user equipment, second content in a second service flow that is transmitted via a transmission mode that is selected from one of a broadcast mode, a multicast mode, or unicast mode based on a user context for the user equipment. The user context is generated based on user-specific information included in packets transmitted by the user equipment. The method further includes combining, at a processor of the user equipment, the first content and the second content for display.

In some embodiments, receiving the first content in the first service flow includes receiving the first content in a broadcast or multicast to a plurality of user equipment that includes the user equipment.

In some embodiments, the first content in the first service flow is interrupted for a predetermined time interval, and combining the first content and the second content includes displaying the second content during the predetermined time interval.

In some embodiments, receiving the first content and the second content includes receiving the first content concurrently with receiving the second content.

In some embodiments, combining the first content and the second content includes non-intrusively displaying the second content concurrently with displaying the first content.

In some embodiments, the method includes installing, at the user equipment, at least one application configured to combine the first content and the second content for display.

In some embodiments, the method includes providing, from the user equipment, spatial or temporal information associated with the user equipment, wherein the spatial or temporal information is used to generate the user context.

In some embodiments, an apparatus is provided for selectively transmitting content in a broadcast mode, a multicast mode, or unicast mode. The apparatus includes a transceiver configured to provide first content in a first service flow associated with a user equipment. The apparatus also includes a processor configured to access a user context for the user equipment. The user context is generated based on user-specific information included in packets received from the user equipment. The processor is also configured to select at least one of a broadcast mode, a multicast mode, or unicast mode for transmitting second content based on a user context for the user equipment. The transceiver is configured to transmit, according to the selected mode, the second content to the user equipment in a second service flow for combination with the first content.

In some embodiments, the transceiver is configured to broadcast or multicast the first content to a plurality of user equipment that includes the user equipment.

In some embodiments, the transceiver is configured to interrupt provision of the first content in the first service flow for a predetermined time interval and the transceiver is configured to selectively broadcast, multicast, or unicast the second content during the predetermined time interval.

In some embodiments, the transceiver is configured to selectively broadcast, multicast, or unicast the second content in the second service flow concurrently with providing the first content in the first service flow.

In some embodiments, wherein the processor is configured to select at least one of unicasting user-specific content to the user equipment, multicasting a second advertisement to a subset of a plurality of user equipment that includes the user equipment, and broadcasting a third advertisement to the plurality of user equipment.

In some embodiments, the processor is configured to select the second content from a set of content streams based on the user context.

In some embodiments, the processor is configured to perform deep packet inspection on the packets received from the first user equipment and generate the user context based on the results of the deep packet inspection.

In some embodiments, the processor is configured to generate the user context based on spatial or temporal information associated with the user equipment.

In some embodiments, the processor is configured to anonymize the user context, and the transceiver is configured to provide the anonymized user context to a third party.

In some embodiments, an apparatus is provided for receiving content that is selectively broadcast, multicast, or unicast. The apparatus includes a transceiver configured to receive first content in a first service flow and second content in a second service flow that is transmitted via a transmission mode that is selected from one of a broadcast mode, a multicast mode, or unicast mode based on a user context for the apparatus. The user context is generated based on user-specific information included in packets transmitted by the apparatus. The apparatus also includes a processor configured to combine the first content and the second content for display.

In some embodiments, the transceiver is configured to receive the first content in a broadcast or multicast to a plurality of user equipment that includes the apparatus.

In some embodiments, the first content in the first service flow is interrupted for a predetermined time interval and the processor is configured to display the second content during the predetermined time interval.

In some embodiments, the transceiver is configured to receive the first content concurrently with receiving the second content.

In some embodiments, the processor is configured to non-intrusively display the second content concurrently with display the first content.

In some embodiments, the processor is configured to install at least one application configured to combine the first content and the second content for display.

In some embodiments, the transceiver is configured to provide spatial or temporal information associated with the apparatus and the spatial or temporal information is used to generate the user context.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
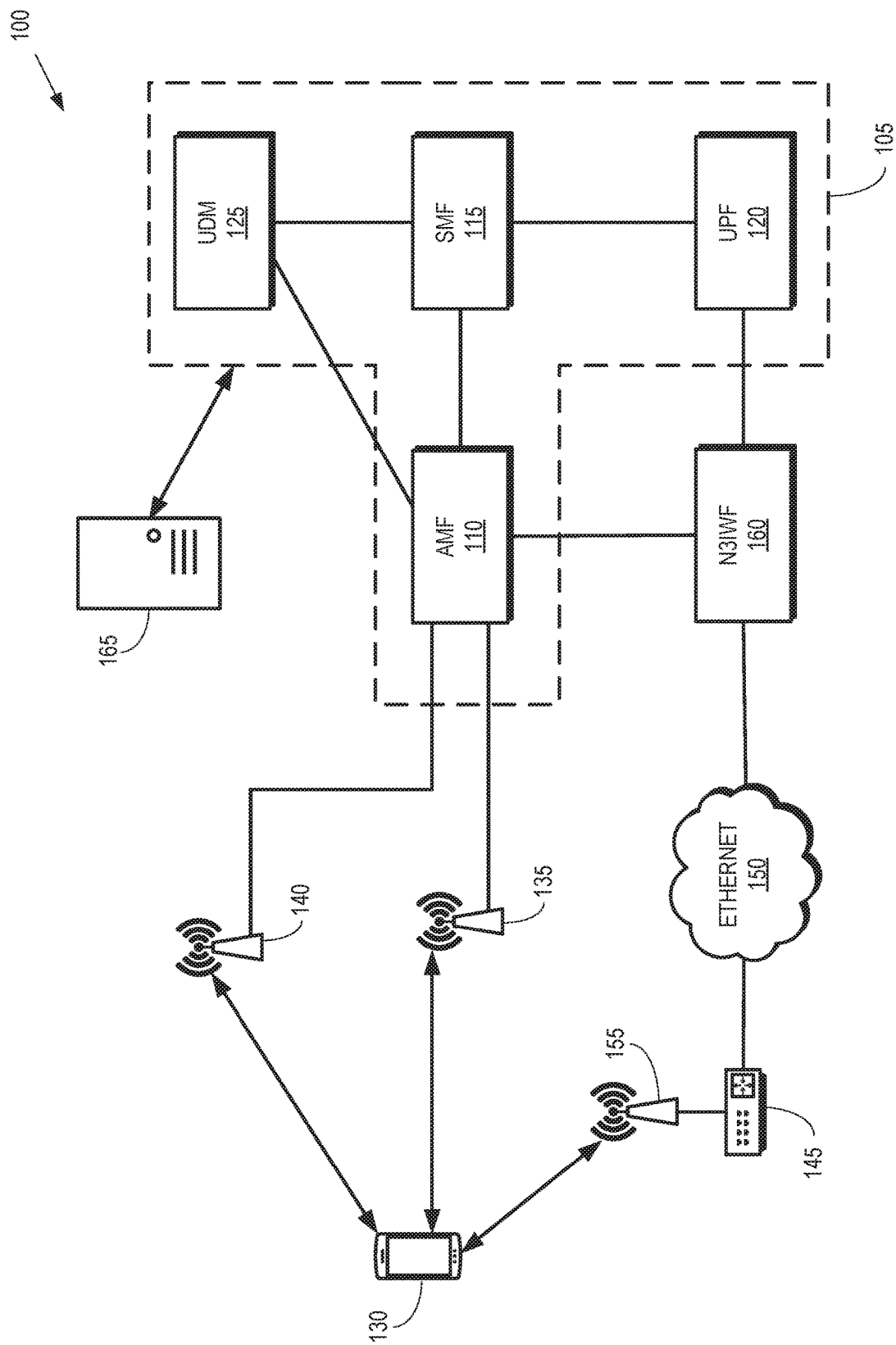
FIG. 1 is a block diagram of a first example of a communication system that supports the selective broadcast, multicast, or unicast of targeted advertising content according to some embodiments.

Multimedia broadcast/multicast services (MBMS) are used to transport the same content to one or more users using shared resources of the wireless communication system. Conventional MBMS systems support broadcasting content to all of the users within the coverage area of a cell when the system is operating in a broadcast mode, multicasting content to a subset of the users within the coverage area of the cell that are indicated by a multicast service identifier when the system is operating in a multicast mode, or unicasting content to individual users within the coverage area the cell based on endpoint identifiers of the users when the system is operating in a unicast mode. In some communication systems, MBMS is used to provide multicast or broadcast information to a single cell or concurrently to multiple cells over a synchronized single-frequency network. In 5G communication systems, broadcasting, multicasting, and unicasting can be collectively referred to as "XCasting," which is provided using fixed access, mobile access, or a combination thereof. In the context of a network, Xcasting attempts to deliver content in the most efficient means to the end user using a combination of broadcasting, multicasting, or unicasting. Wireless access technologies such as Wi-Fi can also be used to support MBMS services, e.g., by providing the final leg for a fixed network. User equipment in the wireless communication system can implement multiple radios for receiving MBMS transmission via fixed or mobile connections. Although increases in coverage areas, spectral efficiency, and capacity have made MBMS transmissions more attractive to mobile network operators (MNOs), the MNOs are not able to effectively monetize MBMS transmissions. The MNOs face similar difficulties in monetizing the transmission of media content, which currently forms the majority of user requested traffic that is transported by the access networks.

Multicast, broadcast, and unicast transmissions (e.g., MBMS or XCast transmissions) can be effectively monetized by gathering user-specific information included in packets received from a user equipment and generating a user context based on the user-specific information. For example, the user-specific information can be gathered using deep packet inspection of packets in a service flow. In some embodiments, the user-specific information includes spatial or temporal information such as a location of the user, a mobility pattern of the user that can be correlated with a time or date. The user-specific information can also include information that enables the MNO to better understand the behavioral patterns of the user. The user context information could be anonymized and exchanged with (or sold to) third parties, as well as used for MNO deployed applications for which connectivity might be provided by another MNO. Anonymizing the user context information can include replacing information in the user context that can be used to identify the user (or user equipment) with randomly generated data.

A network gateway (such as a user plane function, UPF, MBMS gateway, or packet data network gateway, P-GW) multicasts, broadcasts, or unicasts first content (such as a movie or a live sporting event) to the user equipment. The network gateway also selectively multicasts, broadcasts, or unicasts second content (such as advertisements) to the user equipment based on the user context. For example, the network gateway can broadcast a first service flow including first content that represents a live sporting event to users in a cell that includes the user equipment. The network gateway can then unicast personalized individual advertisements, multicast advertisements targeting a subset of the users in the cell, or broadcast advertisements targeting all of the users in the cell. The user equipment combines the first content and the second content for provision to a user, e.g., using a middleware application installed on the user equipment. In some embodiments, the network gateway interrupts transmission of the first content for a predetermined time interval and then selectively multicasts, broadcasts, or unicast the second content to the user equipment during the predetermined time interval. The network gateway can also transmit the second content concurrently with the first content so that the user equipment can present the second content non-intrusively, e.g., in the form of crawlers, running messages, or tickers that overlay the first content in a portion of a screen on the user equipment. In some embodiments, the second content is selected from a set of content streams based on the user context. For example, the set of content streams can include a group of advertisements that are selectively provided to the user based on the user context.

FIG. 1 is a block diagram of a first example of a communication system 100 that supports the selective broadcast, multicast, or unicast of targeted advertising content according to some embodiments. The communication system 100 provides support for both mobile and fixed access. As used herein, the term "mobile access" refers to accessing a communication system (e.g., the communication system 100) over an air interface. Mobile access can therefore be referred to as wireless access, mobile communication, wireless communication, or other similar terms. The term "fixed access" refers to accessing to a communication system using a device that is physically connected to the communication system, e.g., accessing a communication system such as the communication system 100 via wires, optical fibers, and the like. Fixed access can therefore be referred to as wireline access, wired communication, or other similar terms. In some embodiments, the final leg of a fixed access connection can be provided by a wireless access point such as a Wi-Fi access point. The communication system 100 supports hybrid access that allows devices to concurrently access the communication system 100 using mobile access and fixed access.

The communication system 100 includes a core network 105 that is accessible by either mobile or fixed devices using a common user plane access and a control plane that supports common authentication, authorization, and accounting (AAA) and policy control. As used herein, the phrase "user plane" refers to a portion of a routing architecture that performs routing of packets that arrive on an inbound interface. For example, the user plane can be implemented using routing tables to determine a path from the inbound interface through a forwarding fabric to the proper outgoing interface. The user plane can also be referred to as a data plane or a forwarding plane. As used herein, the phrase "control plane" refers to a portion of the routing architecture that defines a network topology. For example, the control plane can be used to configure the routing tables that are used to forward packets on the user plane. Control plane logic can also be used to establish priority or quality-of-service for the packets or to identify packets that should be discarded.

The core network 105 includes an access and mobility management function (AMF) 110 that manages access control and mobility for devices in the communication system 100. The core network 105 also includes a session management function (SMF) 115 to set up and manage sessions in the communication system 100 according to network policies. An association between user equipment and the core network 105 can be represented as a packet data unit (PDU)

session that can be managed by the SMF 115. The PDU session supports data connectivity between user equipment and a data network.

The core network 105 also includes one or more user plane functions (UPF) 120 that can be deployed in the communication system 100 to provide services to users of the communication system 100. The user plane function 120 can function as an endpoint for service flows that are used to broadcast, multicast, or unicast packets, as discussed herein. The user plane function 120 can therefore store endpoint identifiers for the service flows. The core network 105 further includes a unified data manager (UDM) 125 that processes credentials, location management, subscription management, and the like. The UDM 125 stores data including user subscription data, such as subscription identifiers, security credentials, access and mobility related subscription data, and session related subscription data. Some embodiments of the core network 105 include other functionality such as a policy control function and a network function repository function, which are not shown in FIG. 1 in the interest of clarity. Some embodiments of the core network 105 are implemented using network function virtualization and software defined networking, as discussed herein. For example, different network slices can be used to instantiate different instances of the AMF 110, the SMF 115, the UPF 120, or the UDM 125 for different users or devices. Each PDU session is part of one network slice.

The core network 105 provides network access to user equipment 130 via mobile access. For example, the user equipment 130 can access the core network 105 via a base station 135 that is connected to the AMF 110 over a corresponding interface such as an N2 interface. The base station 135 is also connected to the UPF 120 by a corresponding interface such as an N3 interface, which is not shown in FIG. 1 in the interest of clarity. The base station 135 can be implemented as a 5G gigabit NodeB (gNB) in accordance with standards defined by the 3GPP. For another example, the user equipment 130 can access the core network 105 via a base station 140 that is connected to the AMF 110 over a corresponding interface such as an N2 interface. The base station 140 is also connected to the UPF 120 by a corresponding interface such as an N3 interface, which is not shown in FIG. 1 in the interest of clarity. The base station 140 can be implemented as a Terrestrial Broadcast 5G gNB in accordance with standards defined by the 3GPP.

The core network 105 also provides network access to the user equipment 130 via fixed access. For example, the user equipment 130 can establish a connection to a residential gateway 145, which has a wired connection to an Ethernet network 150. In the illustrated embodiment, a final leg of the fixed access connection between the user equipment 130 and the core network 105 is implemented using a wireless access technology. For example, a Wi-Fi access point 155 can be used to provide the final leg of the fixed access connection. However, in other cases, the user equipment 130 is connected to the residential gateway 145 using a wired connection. Some embodiments of the wired connection use line termination devices such as a digital subscriber line access multiplexer (DSLAM) or a gigabit passive optical network (GPON).

An interworking function 160 is disposed between the Ethernet network 150 and the core network 105. The interworking function 160 can also be referred to as a non-3GPP interworking function (N3IWF). The interworking function 160 is configured to modify or translate messages conveyed from the fixed access user equipment to the core network 105 so that the fixed access user equipment appears to be accessing the core network 105 according to mobile access standards or protocols from the perspective of the core network 105. The interworking function 160 is also configured to modify or translate messages conveyed from the core network 105 to the fixed access user equipment so that the messages received by the fixed access user equipment conform to corresponding fixed access standards or protocols. The interworking function 160 supports interfaces with the AMF 110 and the UPF 120.

A content provider 165 provides content such as audio, video, or multimedia to the core network 105 for provision to the user equipment 130, as well as distribution to other user equipment (not shown in FIG. 1 in the interest of clarity). The content provider 165 can be implemented using one or more servers. Content generated by the content provider 165 can be broadcast, multicast, or unicast to the user equipment 130, which enables resource-efficient content distribution. Examples of content that can be broadcast or multicast include television broadcasts and public safety broadcasts such as public warning systems, mission-critical communication systems, and the like. Improvements in the content quality requirements and the time criticality of the provided content have given an increase in the proportion of the radio resources of the communication system 100 that are consumed by broadcast or multicast content. For example, advanced video and audio codecs can be used to enhance the quality of experience of the end-users, but this requires that network operators allocate larger amounts of radio resources to efficiently and effectively deliver this content to the end-user.

Efficient use of the increasingly scarce radio resources can be facilitated using higher cyclic prefix lengths to support delivery of broadcast or multicast traffic, especially in high power, high tower base station deployments. Additional enhancements allow the communication system 100 to provide higher spectral efficiency and capacity. For example, the core network 105 can be implemented as a converged network that provides interworking between the fixed, mobile, and terrestrial networks that include the residential gateway 145, the base station 135, and the base station 140, respectively. The converged core network 105 can therefore broadcast, multicast, or unicast content generated by the content provider 165 to the user equipment 130 via the base station 135, the base station 140, the residential gateway 145, or a combination thereof. Broadcasting, multicasting, or unicasting content via the converged core network 105 is referred to as XCasting the content provided by the content provider 165.

The core network 105 is configured to provide targeted advertising that can be incorporated into other content provided by the content provider 165 for display at the user equipment 130. In the illustrated embodiment, the user plane function 120 is configured as a network gateway that is an endpoint of service flows between the core network 105 and the user equipment 130, which is the other endpoint of the service flows. The user plane function 120 receives first content (e.g., television, movies, or live sporting events) from the content provider 165 and provides the first content to the user equipment 130 in a first service flow. The user plane function 120 is also able to access a user context for the user equipment 130. The user context is generated based on user-specific information included in packets received from the user equipment 130, as discussed herein. The user plane function 120 receives a second content from the content provider 165 (or another provider) and determines whether to broadcast, multicast, or unicast the second content to the user equipment 130 based on the user context.

The second content can be selectively broadcast, multicast or unicast to the user equipment 130 in a pre-negotiated time interval or concurrently with provision of the first content, as discussed herein. Negotiation of a time interval for providing the second content is disclosed in PCT Application No. PCT/IB2017/050096, entitled "METHOD AND APPARATUS FOR COORDINATED CONTENT DELIVERY IN MULTICAST/BROADCAST NETWORKS," which was filed Jan. 9, 2017 and is incorporated herein by reference in its entirety.

The user equipment 130 receives the first content in the first service flow and the second content in the second service flow that is selectively broadcast, multicast, and/or unicast via one or more of the base stations 135, 140 or the fixed access network including the residential gateway 145 and (if present) the Wi-Fi access point 155. In some embodiments, the base stations 135, 140 use different transmission modes for the first and second service flows. For example, the base station 135 can use a broadcast mode to broadcast the first service flow and the base station 140 can use a multicast mode or unicast mode to multicast or unicast the second service flow. The user equipment 130 can then combine the first content and the second content for display. Combining the first content and the second content can include inserting the second content into a pre-negotiated time interval during which the first content is interrupted. Combining the first content and the second content can also include non-intrusively overlaying the second content with the first content if the second content is received concurrently with the first content. Examples of non-intrusive combinations include using the second content to generate crawlers, running messages, or tickers in a portion of an image generated using the first content. In some cases, unicast advertisement streams can be superposed over broadcast news content within a webpage, e.g., using object-oriented broadcasting. Some embodiments of the user equipment 130 install middleware applications and/or plugins to configure the user equipment 130 to combine the first and second content.

Figure 2:
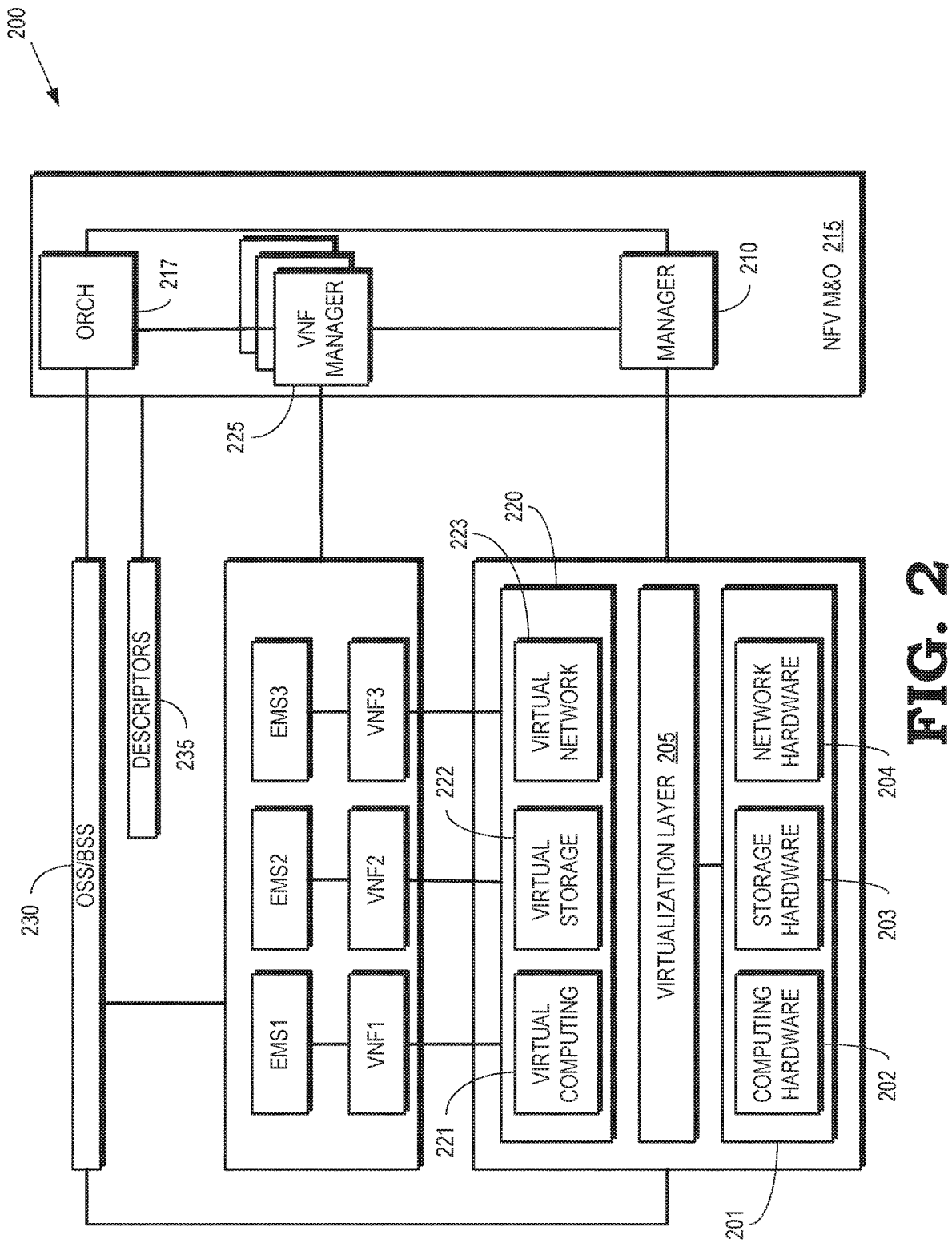
FIG. 2 is a block diagram of an NFV architecture according to some embodiments.

FIG. 2 is a block diagram of an NFV architecture 200 according to some embodiments. The NFV architecture 200 is used to implement some embodiments of the communication system 100 shown in FIG. 1. The NFV architecture 200 includes hardware resources 201 including computing hardware 202, storage hardware 203, and network hardware 204. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing resources 221, virtual storage resources 222, and virtual networking resources 223.

Virtual networking functions (VNF1, VNF2, VNF3) run over the NFV infrastructure (e.g., the hardware resources 201) and utilize the virtual resources 220. For example the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices that provide control plane functions or user plane functions, such as instances of the AMF 110, the SMF 115, or the UPF 120 shown in FIG. 1. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
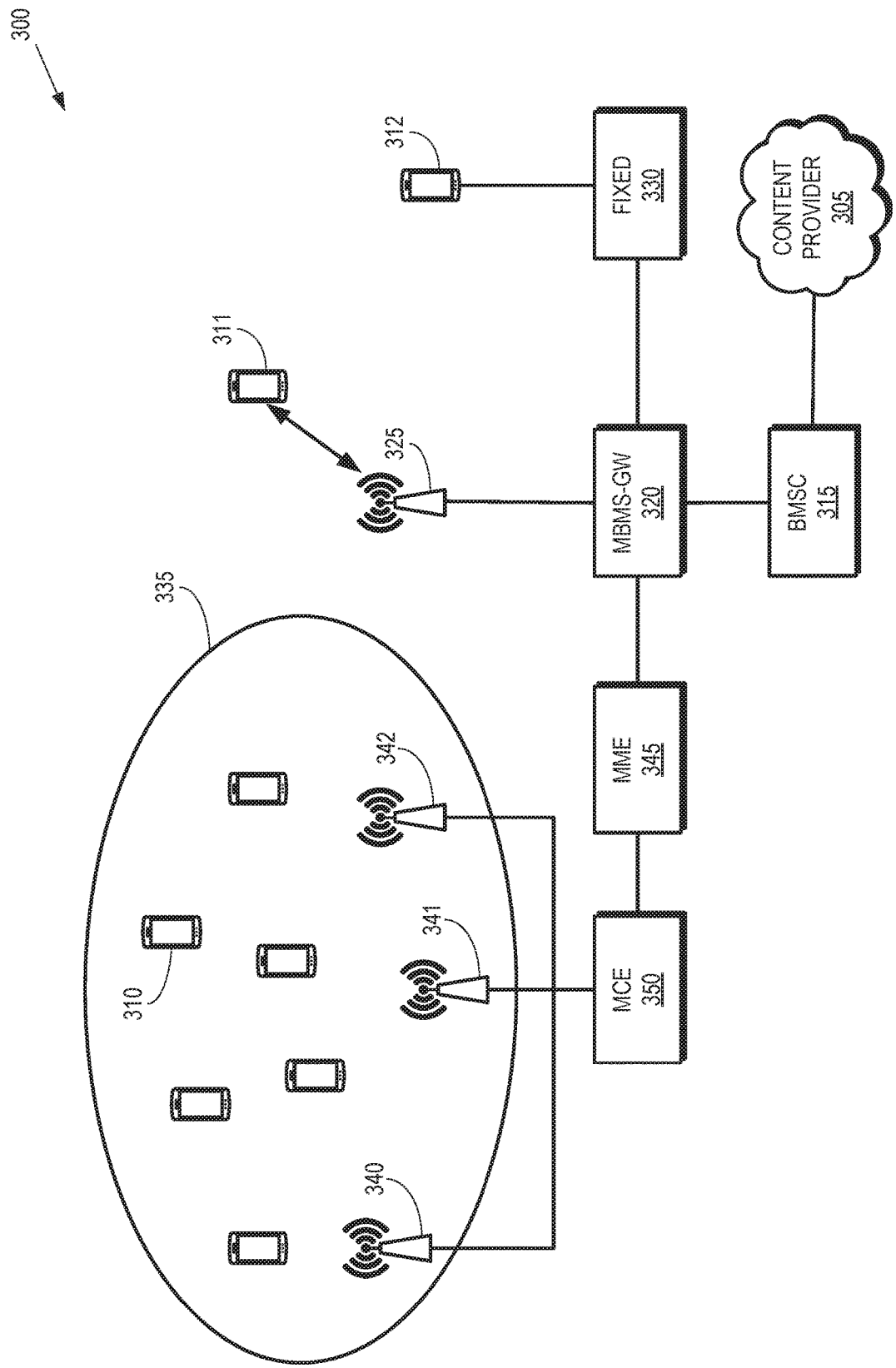
FIG. 3 is a block diagram of a second example of a communication system that supports the selective broadcast, multicast, or unicast of targeted advertising content using a single frequency network (SFN) according to some embodiments.

FIG. 3 is a block diagram of a second example of a communication system 300 that supports the selective broadcast, multicast, or unicast of targeted advertising content using a single frequency network (SFN) according to some embodiments. The communication system 300 includes a content provider 305 that generates or provides content for distribution to user equipment 310, 311, 312 (collectively referred to herein as "the user equipment 310-312"). The content provider 305 can be implemented as a single server or using a distributed set of servers that are coordinated to provide content for distribution to the user equipment 310-312. As discussed herein, the content can include primary content such as television, movies, and live sporting events, as well as secondary content such as advertising. In some embodiments, the secondary content includes content that reflects the user's viewing preferences, which can be indicated in the user context. For example, the secondary content can include subtitles that are selected based on a language used for the primary content and a preferred language indicated in the user context. For another example, if the user context indicates that the viewer is not an adult, violent or explicit portions of the primary content such as profanity, blood, nudity, and the like can be removed by unicasting user-preferred secondary content to pixelate or cover portions of the primary content that is viewed by the user. Personalized advertisements and user-preferred content are generally referred to as "user-specific" content. The content is provided to a broadcast multicast service center (BMSC) 315, which is responsible for authentication and authorization of the user equipment 310-312 and the content provider 305, user charging, and the like.

The BMSC 315 provides content to a network gateway such as an MBMS gateway (MBMS-GW) 320, which is responsible for distributing the content to the user equipment 310-312. The MBMS gateway 320 controls MBMS session initiation, modification, and termination. Some embodiments of the MBMS gateway 320 are endpoints for service flows used to convey packets including the content to the user equipment 310-312. For example, the MBMS gateway 320 can provide the content to a base station 325 (such as a 5G gigabit NodeB, gNB) for broadcasting, multicasting, or unicasting to the user equipment 311 using an endpoint identifier of the user equipment 311. For another example, the MBMS gateway 320 can provide the content to a fixed network 330 for unicasting to the user equipment 312 using an endpoint identifier of the user equipment 312, possibly using IP multicast packets. As discussed herein, the connection between the fixed network 330 and the user equipment 312 can be formed using a wired connection or using an access point to provide the final leg.

The communication system 300 also supports a multicast broadcast SFN (MBSFN) within an MBSFN area 335. In the MBSFN, transmitters including multiple time-synchronized base stations 340, 341, 342 (collectively referred to herein as "the base stations 340-342") simultaneously or concurrently transmit the same signal over the same frequency channel to the user equipment 310 (only one indicated using a reference numeral in the interest of clarity) within the MBSFN area 335 using corresponding endpoint identifiers. The user equipment 311 combines the signals received from the base station 340-342 to enhance the overall signal quality. The MBMS gateway 320 provides content for broadcasting, multicasting, or unicasting within the MBSFN area 335 via a mobility management entity (MME) 345 and a multi-cell/multicast coordination entity (MCE) 350. The MME 345 is a control plane entity that supports non-access stratum (NAS) signaling, gateway selection, roaming, authentication, bearer management, and the like. The MCE 350 provides admission control and allocation of radio resources for the base stations 340-340 within the MBSFN area 335.

Some embodiments of the communication system 300 are implemented as a converged network that provides interworking between the fixed network 330, the base station 325, and the MBSFN. The converged network can therefore broadcast, multicast, or unicast content generated by the content provider 305 to the user equipment 310-312 via the fixed network 330, the base stations 325, 340-342, or a combination thereof. In the illustrated embodiment, the MBMS gateway 320 is configured to selectively broadcast, multicast, or unicast targeted advertising content to the user equipment 310-312 for combination with primary content at the user equipment 310-312. For example, the MBMS gateway 320 can receive first content (e.g., television, movies, or live sporting events) from the content provider 305 and provide the first content to the user equipment 310-312 in a first service flow. The MBMS gateway 320 is also able to access user contexts for the user equipment 310-312. The user contexts are generated based on user-specific information. The MBMS gateway 320 receives second content from the content provider 305 or the second content could be locally cached at the gateway 320 depending on the content ownership and advertisement insertion agreements with the content provider and/or owner. The MBMS gateway 320 selects a broadcast mode, a multicast mode, or a unicast mode for transmitting the second content to one or more of the user equipment 310-312 based on the user contexts. The user equipment 310-312 can then combine the first content with the selectively provided second content, e.g., in a pre-negotiated time interval or as a non-intrusive overlay.

Figure 4:
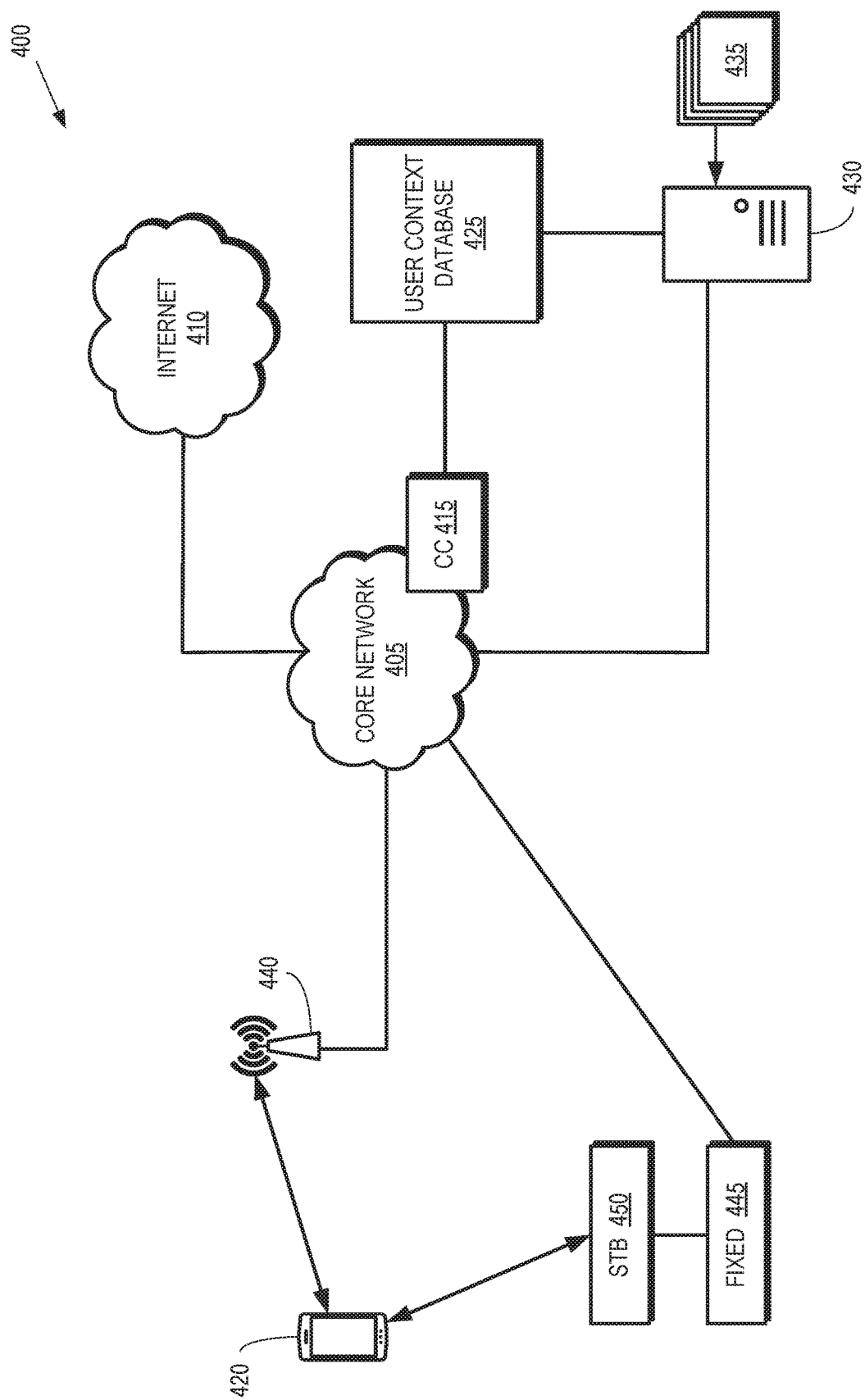
FIG. 4 is a block diagram of a third example of a communication system that supports collection of user context information and the selective broadcast, multicast, or unicast of advertising content that is targeted based on the user context information according to some embodiments.

FIG. 4 is a block diagram of a third example of a communication system 400 that supports collection of user context information and the selective broadcast, multicast, or unicast of advertising content that is targeted based on the user context information according to some embodiments. The communication system 400 includes a core network 405 that provides connectivity to an external network such as the Internet 410. The core network 405 is implemented using some embodiments of the core network 105 shown in FIG. 1. The core network 405 can be implemented according to standards defined by the 3GPP. For example, the core network 405 can be implemented according to the Long Term Evolution (LTE) standards or the 5G standards defined by the 3GPP. Although a single core network 405 is shown in FIG. 4, some embodiments of the communication system 400 include multiple core networks such as a core network 400 that is implemented according to LTE and another core network that is implemented according to 5G standards.

The core network 405 includes, or is associated with, a context creator (CC) 415 that is configured to create user contexts based on information associated with user equipment in the communication system 400 such as a user equipment 420. Some embodiments of the context creator 415 generate the user context for the user equipment 420 using information received from the user equipment 420 in real-time by a network gateway that acts as an endpoint of service flows such as the user plane function 120 shown in FIG. 1 and the MBMS gateway 320 shown in FIG. 3. For example, the context creator 415 can perform deep packet inspection on packets received from the user equipment 420 and generate the user context based on the results of the deep packet inspection. For another example, the context creator 415 can use destination IP address mapping to generate the user context. The context creator 415 can then store the user context (or modify an existing user context) in a user context database 425. Some embodiments of the context creator 415 are configured to anonymize the user context information, e.g., by replacing information that identifies a user or the user equipment 420 with random data.

Some embodiments of the context creator 415 are also configured to create user contexts based on spatial or temporal information associated with the user equipment 420. Spatial information, such as the location of the user equipment 420, can be determined using triangulation or radiofrequency fingerprinting. For example, triangulation can be used to identify the location of the user equipment 420 using base station identifiers included in measurement reports provided by the user equipment 420. The context creator 415 (or other entity) can also send a request to the user equipment 420 to report its location. The user equipment 420 can also report service set identifiers (SSID) of Wi-Fi access points that are detected by the user equipment 420. The context creator 415 can use the SSIDs to determine a location of the user equipment 420. The locations can be represented as geographical coordinates or using place names such as supermarkets, shopping malls, stadiums, and the like. The context creator 415 generate temporal information by correlating particular events with the time at which the event takes place. For example, a time series of purchases of printer cartridge refills can be used to generate context information that indicates a likely time at which the user is going to purchase the next printer cartridge refill.

The context creator 415 can also generate context information by applying deep-learning principles in a memoryless fashion. For example, deep learning can be applied to real time browsing or search information associated with the user equipment 420. Deep learning can also be applied to current location information associated with the user equipment 420. Deep learning can be applied to historical information. For example, the context creator 415 can take into account long-term patterns in the user behavior such as past browsing history, purchasing patterns for items purchased using the user equipment 420, historical location information, and the like.

The communication system 400 includes a content provider 430 that generates or provides content for display by the user equipment 420. The primary content provided by the content provider 430 can include television programs, movies, live sporting events, and the like. The content provider 430 is also configured to provide secondary content 435 such as advertisements that can be inserted into the primary content for display in pre-negotiated time intervals or overlaid for concurrent display with the primary content. In the illustrated embodiment, the content provider 430 has access to a set of secondary content 435 that includes multiple different streams of secondary content 435 that can be selectively provided to the user equipment 420 based on user context information. The set of secondary content 435 can be stored by (or accessible to) the content provider 430, which provides the secondary content 435 according to revenue-sharing agreements with third parties. The secondary content 435 can also be provided to the content provider 430 as multiple streams of advertising content during advertisement insertion time intervals.

The content provider 430 selectively provides the secondary content 435 based on the user context associated with the user equipment 420. For example, the user context for the user equipment 420 can indicate that the primary content being viewed by the user is an instruction video for fixing a leaky toilet, in which case the content provider 430 can provide secondary content 435 including an advertisement for Home Depot. For another example, the user context for the user equipment 420 can indicate that the user is in a shopping mall, in which case the content provider 430 can selectively provide secondary content 435 that includes advertisements for stores in the shopping mall, discount offers for items in the stores, and the like. In some embodiments, the content provider 420 can utilize a combination of spatial, temporal and user behavioral patterns to select the secondary content.

The core network 405 is able to provide content using a mobile network via one or more base stations 440 or using a fixed network 445 via a set-top box (STB) 450. For example, the core network 405 can be a converged network such as the core network 105 shown in FIG. 1 that is able to selectively broadcast, multicast, or unicast content to the user equipment 420 through various possible access networks. For example, the secondary content 435 can be unicast to the user equipment 420 for personalized individual advertisements that are selected or generated based on the user context, multicast for advertisements targeting a group of users within the coverage region of a cell that includes the user equipment 420, and broadcast for targeting all the users within the coverage region of a cell that includes the user equipment 420.

Figure 5:
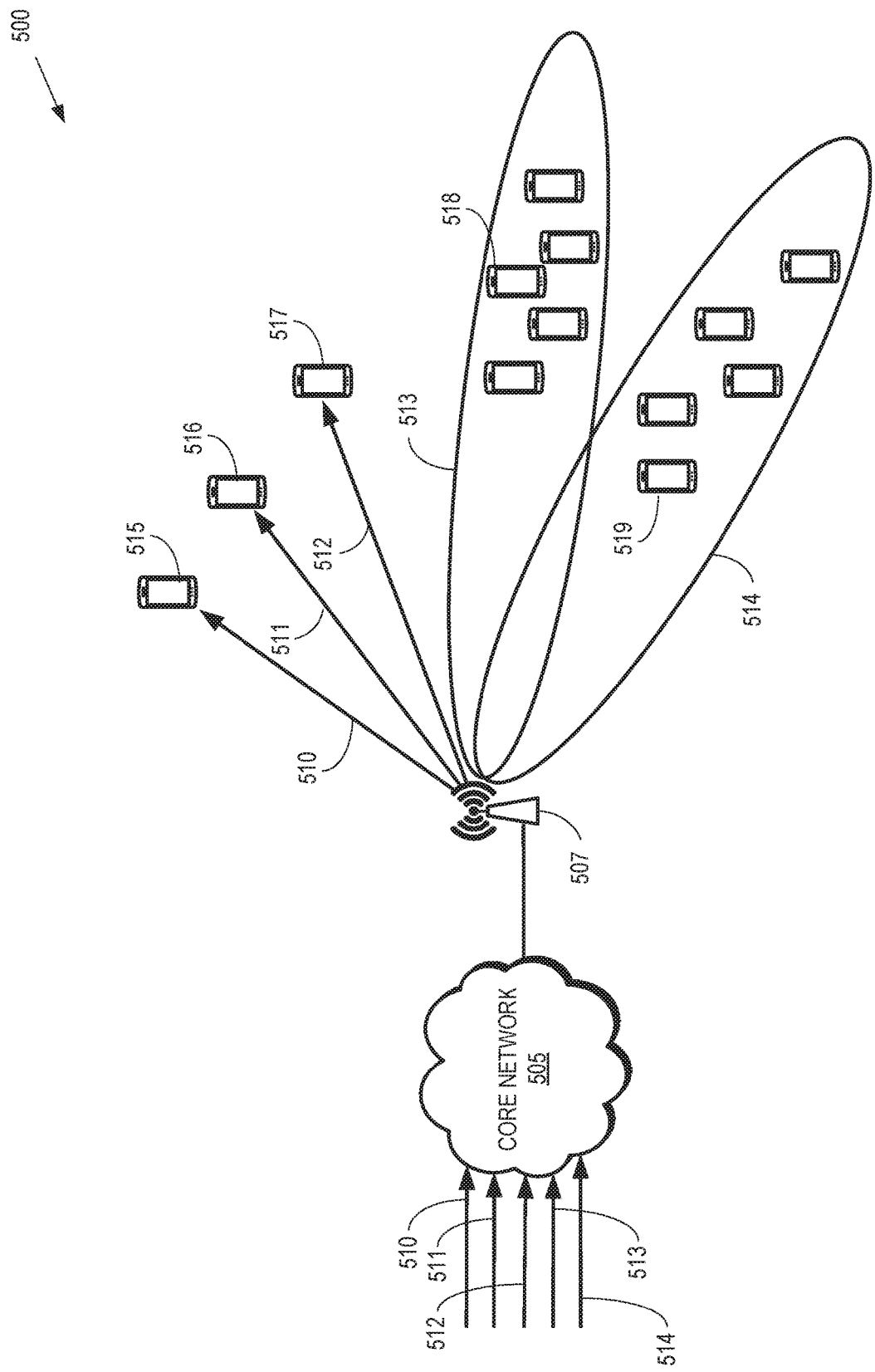
FIG. 5 is a block diagram of a fourth example of a communication system that is configured to selectively broadcast, multicast, or unicast of advertising content that is targeted based on user context information according to some embodiments.

FIG. 5 is a block diagram of a fourth example of a communication system 500 that is configured to selectively broadcast, multicast, or unicast of advertising content that is targeted based on user context information according to some embodiments. The communication system 500 includes a core network 505 that provides converged connectivity. The core network 505 is implemented using some embodiments of the core network 105 shown in FIG. 1. Although not shown in FIG. 5, the core network 505 includes a network gateway such as the user plane function 120 shown in FIG. 1 and the MBMS gateway 320 shown in FIG. 3. The network gateway stores endpoint identifiers of users in the communication system 500 and functions as an endpoint for service flows between the users and the core network 505. The network gateway can also store multicast identifiers of the multicast groups of users in the communication system 500 and function as an endpoint for multicast service flows between the core network 505 and users that have subscribed to the multicast service. The network gateway can also store and use the endpoint identifiers of base stations (such as the base station 507) for content that is be broadcasted to a geographical area served by the base stations. The geographical area or the base stations can be identified based on the preferences of the user and/or agreements with the advertisers.

The core network 505 receives advertising content streams 510, 511, 512, 513, 514 that are collectively referred to herein as "the streams 510-514." In some embodiments, the content provider/MNO has previously reached an agreement with a provider to provide the advertising content in the streams 510-514 to users in the communication system 500. The agreement indicates that advertising content in the streams 510-514 can be broadcast, multicast, or unicast to the end users based on user context information, such as the user context stored in the user context database 425 shown in FIG. 4.

The network gateway in the core network 505 can selectively broadcast, multicast, or unicast the advertising content in the streams 510 based on user contexts associated with the users. In the illustrated embodiment, the network gateway unicasts the stream 510 to user equipment 515, unicasts the stream 511 to the user equipment 516, and unicasts the stream 512 to the user equipment 517. For example, if the user contexts for the user equipment 515, 516, 517 indicate that the user is visiting websites that are used for selling houses, cars, and the like, advertising content in the relevant streams 510, 511, 512 are delivered to such users using unicast. This could enable the MNO and content provider to generate more revenue through targeted advertisements. In the illustrated embodiment, the network gateway broadcasts the stream 513 to user equipment 518 (only one indicated by a reference numeral in the interest of clarity) within a geographical region served by the core network 505. For example, if the advertising content in the stream 513 is relevant to a particular location such as shopping malls, supermarkets, and the like, the advertising content in the stream 513 could be delivered using broadcast to the user equipment 518 within the coverage footprint of such locations. In the illustrated embodiment, the network gateway multicasts the advertising content in the stream 514 to the user equipment 519 (only one indicated by a reference numeral in the interest of clarity). Multicasting can be used to deliver the stream 514 to a subset of users within the coverage area such as users that have subscribed to the multicast services users within an age group, users with common interests, and the like. The user equipment 519 in the multicast group can be indicated by a multicast identifier.

Figure 6:
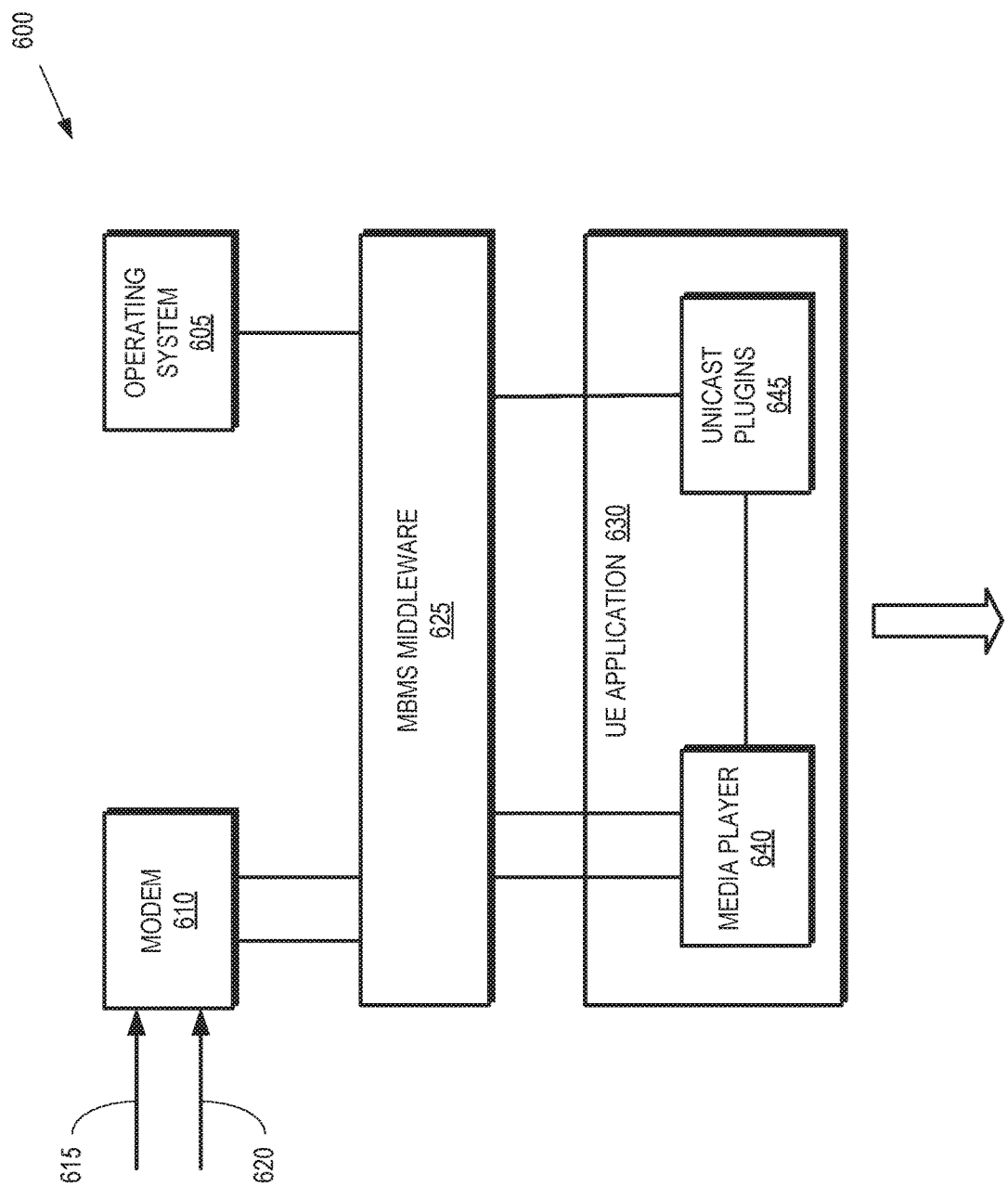
FIG. 6 is a block diagram of a user equipment that is configured to combine primary content and secondary content that is selectively broadcast, multicast or unicast based on the context associated with the user equipment according to some embodiments.

FIG. 6 is a block diagram of a user equipment 600 that is configured to combine primary content and secondary content that is selectively broadcast, multicast or unicast based on the context associated with the user equipment 600 according to some embodiments. The user equipment 600 is used to implement some embodiments of the user equipment 130 shown in FIG. 1, the user equipment 310-312 shown in FIG. 3, the user equipment 420 shown in FIG. 4, and the user equipment 515-519 shown in FIG. 5.

The user equipment 600 includes an operating system 605 that manages the hardware and software resources implemented in the user equipment 600. The user equipment 600 also includes a modem 610 that is configured to receive a first stream 615 that includes first content and a second stream 620 that includes a second content. In some embodiments, the first stream 615 is broadcast or multicast to a group of user equipment that include the user equipment 600. For example, the first stream 615 can include content that represents a television program, a movie, or a live sporting event that is viewed by a group of users. The second stream 620 is selectively broadcast, multicast, or unicast to the user equipment 600. The second stream 620 can be selectively broadcast, multicast, or unicast to the user equipment 600 during a time interval in which the first stream 615 is interrupted to provide time to insert the second content in the second stream 620. The second stream 620 can also be selectively broadcast, multicast, or unicast to the user equipment 600 concurrently with the first stream 615.

The user equipment 600 implements MBMS middleware 625 that receives broadcast, multicast, and unicast content from the modem 610. The MBMS middleware 625 can provide the received content to an application layer 630. In the illustrated embodiment, the MBMS middleware 625 provides primary content, which can be broadcast, multicast, and unicast content, to a media player 640 implemented in the application layer 630. The MBMS middleware 625 provides unicast secondary content to a unicast plug-in 645 that is implemented in the application layer 630.

The MBMS middleware 625 and the unicast plug-in 645 are coordinated to combine the first stream 615 and the second stream 624 provision to a user via the media player 640. In some embodiments, the MBMS middleware 625 and the unicast plug-in 645 combine the first stream 615 with the concurrently received second stream 620 to generate non-intrusive advertisements. For example, the first stream 615 can be broadcast or multicast to the user equipment 600 and the second stream 620 can be unicast to the user equipment 600. The MBMS middleware 625 and the unicast plug-in 645 use the information in the second stream 620 to provision non-intrusive advertisements in the form of crawlers, running messages, tickers, and the like for display by the user equipment 600. Thus, the advertisements can be provided without interrupting the first content in the first stream 615. For example, the MBMS middleware 625 and the unicast plug-in 645 can implement object-oriented broadcasting to superpose unicast advertisement streams (such as the stream 620) over news content (such as the stream 615) within a webpage. The MBMS middleware 625 or the unicast plug-in 645 can be provisioned to the user equipment 600 prior to selling the user equipment 600 to a user or they can subsequently be downloaded to the user equipment 600 by the user.

Figure 7:
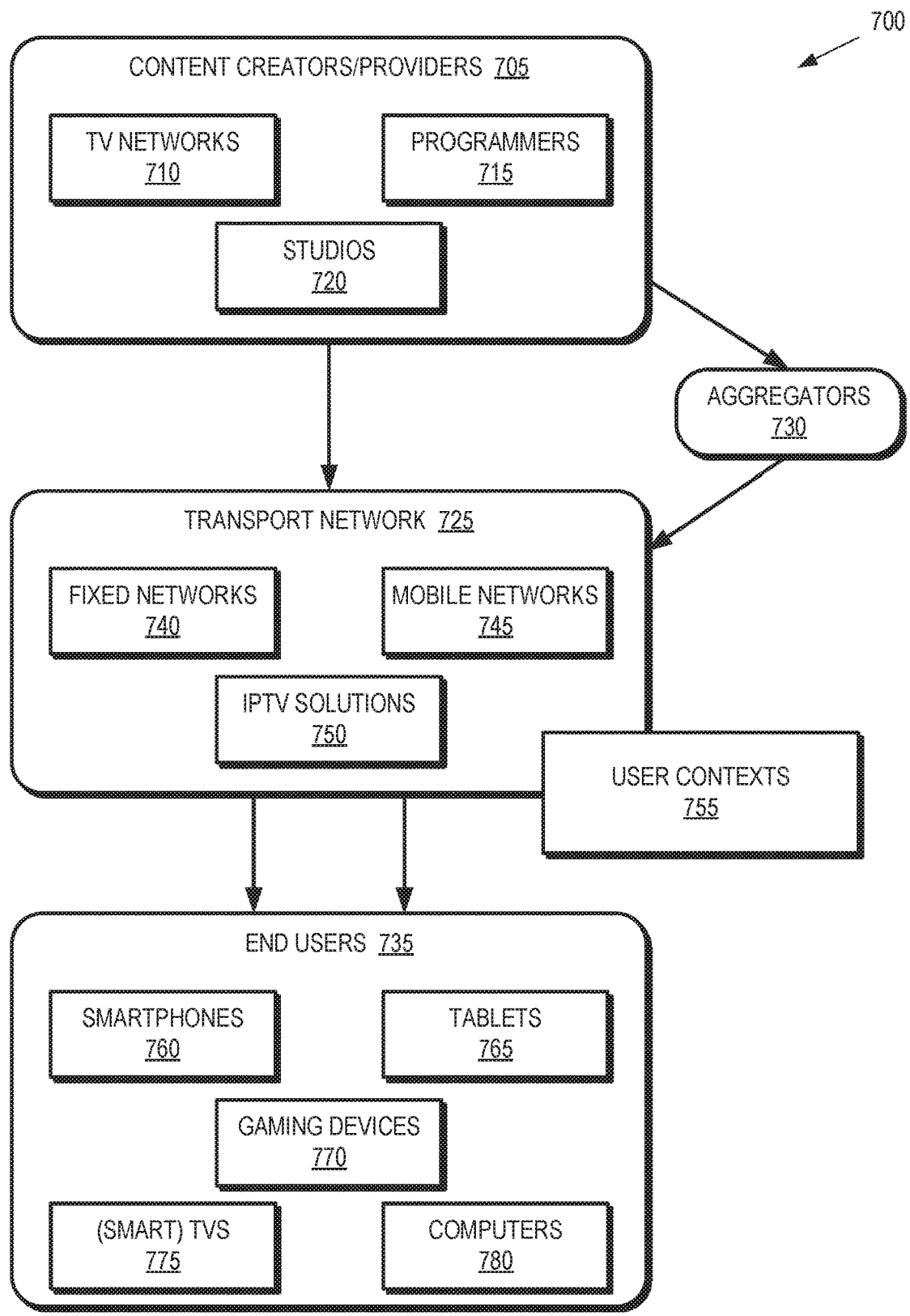
FIG. 7 is a block diagram of an end-to-end solution for selectively broadcasting, multicasting, or unicasting advertising content based on a user context according to some embodiments.

FIG. 7 is a block diagram of an end-to-end solution 700 for selectively broadcasting, multicasting, or unicasting advertising content based on a user context according to some embodiments. In the end-to-end solution 700, context creators/providers 705 generate and provide content to be displayed to users. As discussed herein, the content includes primary content such as television programs, movies, or live sporting events, and secondary content such as advertisements. The context creators/providers 705 can include TV networks 710, programmers 715, television or movie studios 720, and the like. The context creators/providers 705 can provide content directly to a transport network 725 or the context creators/providers 705 can provide the content to an aggregator 730, which forwards aggregated content to the transport network 725.

The transport network 725 is used to selectively broadcast, multicast, or unicast the provided content to one or more end-users 735. The transport network 725 is implemented using portions of some embodiments of the communication system 100 shown in FIG. 1, the NFV architecture 200 shown in FIG. 2, the communication system 300 shown in FIG. 3, the communication system 400 shown in FIG. 4, and the communication system 500 shown in FIG. 5. The transport network 725 includes one or more fixed networks 740, mobile networks 745, IP TV solutions 750, and the like. As discussed herein, secondary content such as advertising content can be selectively broadcast, multicast, or unicast to the end-users 735 based on user contexts 755 associated with the end-users 735.

The end-users 735 include user equipment such as smart phones 760, tablets 765, gaming devices 770, televisions including smart TVs 775, computers 780, and the like. The end-users 735 are implemented using some embodiments of the user equipment 600 shown in FIG. 6.

Figure 8:
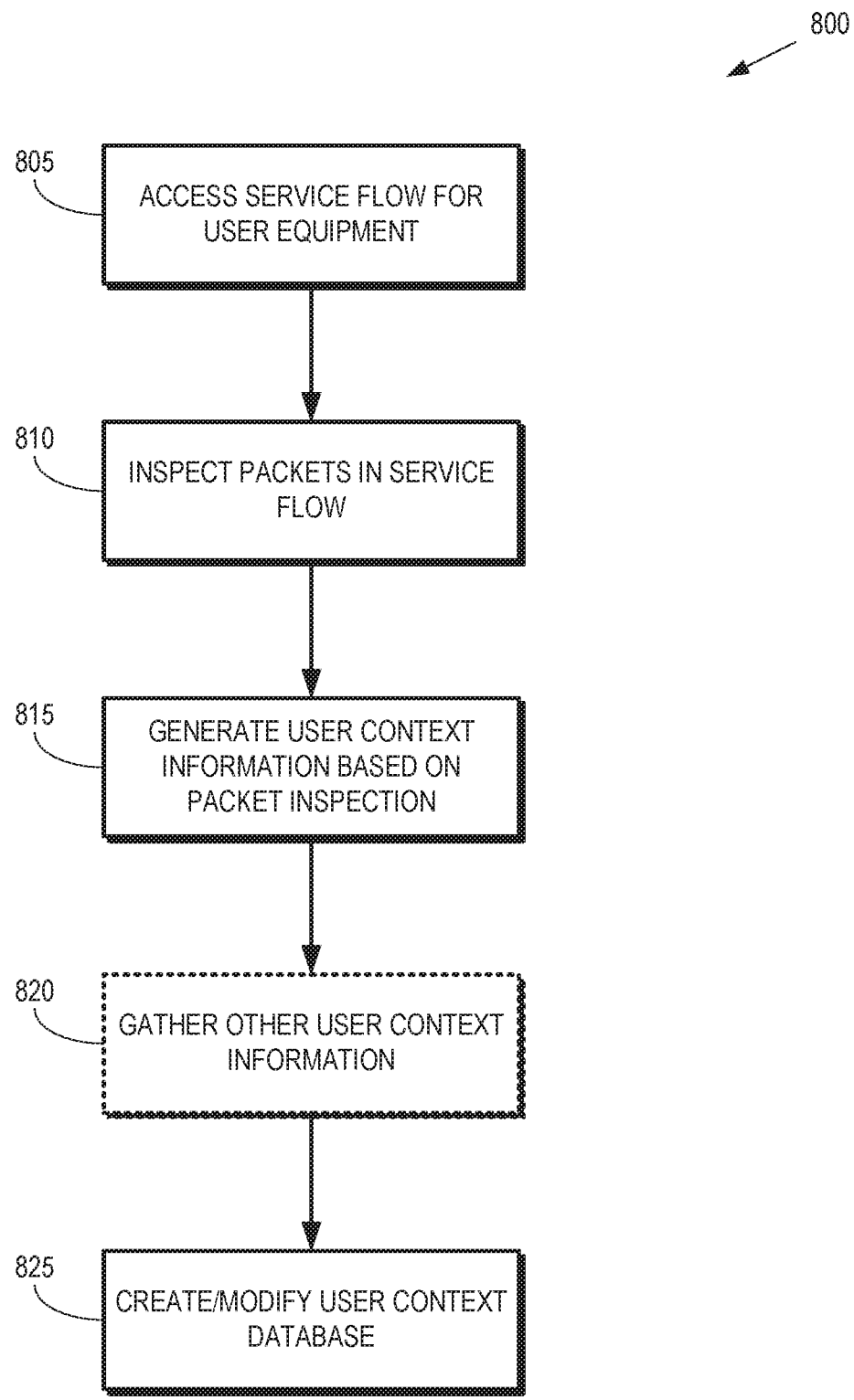
FIG. 8 is a flow diagram of a method for creating user contexts for user equipment according to some embodiments.

FIG. 8 is a flow diagram of a method 800 for creating user contexts for user equipment according to some embodiments. The method 800 is implemented in some embodiments of the communication system 100 shown in FIG. 1, the NFV architecture 200 shown in FIG. 2, the communication system 300 shown in FIG. 3, the communication system 400 shown in FIG. 4, the communication system 500 shown in FIG. 5, and the end-to-end solution 700 shown in FIG. 7. For example, the method 800 can be implemented in a context creator such as the context creator 415 shown in FIG. 4.

At block 805, the context creator accesses a service flow associated with a user equipment. For example, the context creator can access a service flow established between the user equipment and a user plane function such as the user plane function 120 shown in FIG. 2 or an MBMS gateway such as the MBMS gateway 320 shown in FIG. 3.

At block 810, the context creator inspects packets in the service flow to extract real-time information from the packets. In some embodiments, the context creator uses deep packet inspection to extract the real-time information.

At block 815, the context creator generates user context information for the user equipment based on the results of the packet inspection. For example, the context creator can generate user preferences, spatial information, temporal information, and the like. In some embodiments, the context creator gathers (at block 820) additional user context information such as historical information. However, the block 820 is optional, as indicated by the dotted lines, and is not performed in all embodiments of the method 800.

At block 825, the context creator creates a new context (or modifies an existing context) and a user context database. For example, the context creator can create or modify context in the user context database 425 shown in FIG. 4. In some embodiments, the context creator can also create an anonymized version of the context, which can be provided to third parties.

Figure 9:
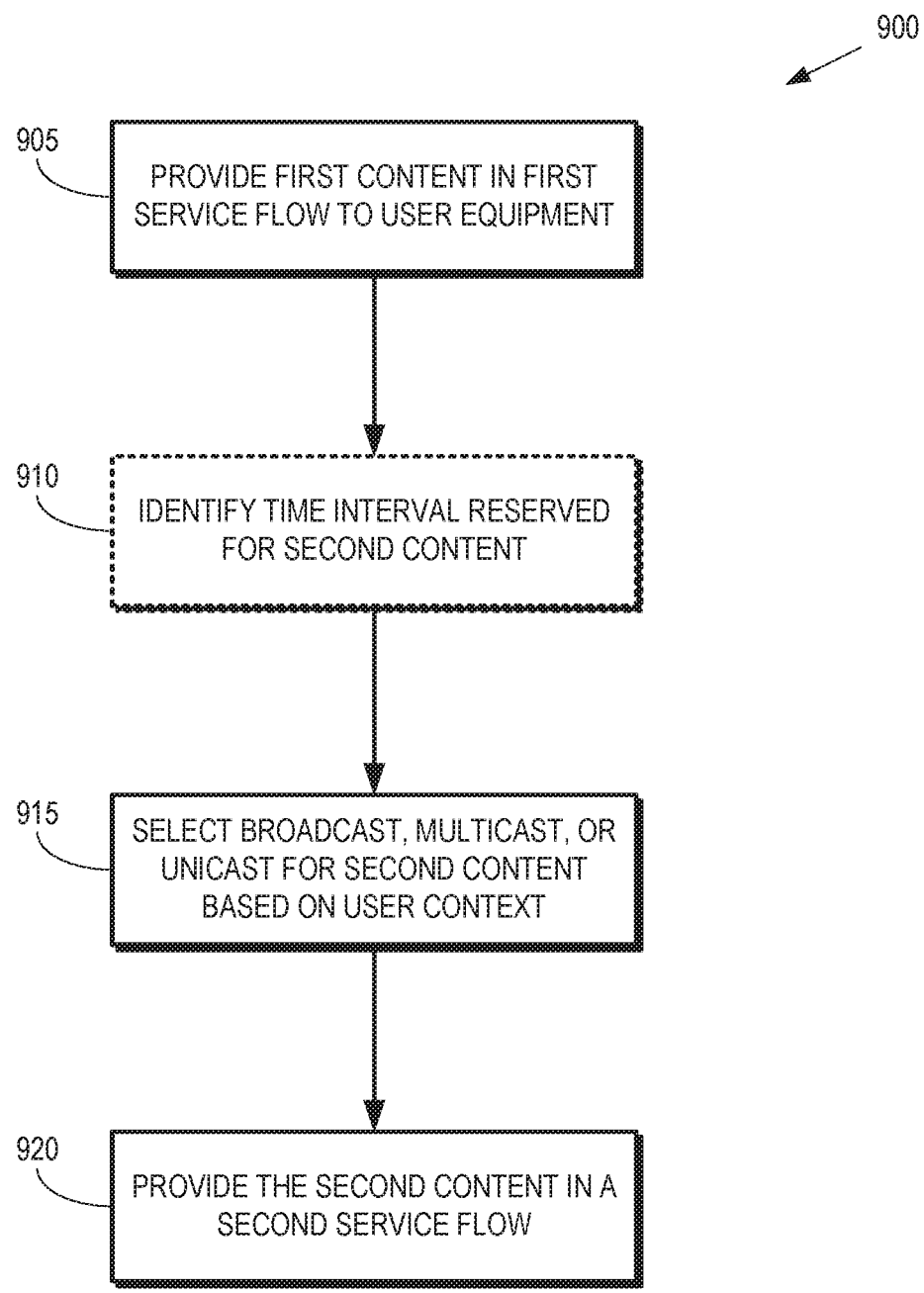
FIG. 9 is a flow diagram of a method for selectively providing content to user equipment based on a user context according to some embodiments.

FIG. 9 is a flow diagram of a method 900 for selectively providing content to user equipment based on a user context according to some embodiments. The method 900 is implemented in some embodiments of the communication system 100 shown in FIG. 1, the NFV architecture 200 shown in FIG. 2, the communication system 300 shown in FIG. 3, the communication system 400 shown in FIG. 4, the communication system 500 shown in FIG. 5, and the end-to-end solution 700 shown in FIG. 7. For example, the method 900 can be implemented in a network gateway such as the user plane function 120 shown in FIG. 1 or the MBMS gateway 320 shown in FIG. 3.

At block 905, the network gateway provides first content in a first service flow to a user equipment. The network gateway is a first endpoint of the first service flow and stores an endpoint identifier of the user equipment. Packets in the first service flow can be broadcast or multicast to groups of user equipment that include the user equipment.

At block 910, the network gateway can identify a time interval reserved for display of second content, such as advertising content. For example, a time interval can be negotiated during which the network gateway interrupts provision of the first content to allow insertion of the second content. However, block 910 is an optional step that is not performed at all embodiments of the method 900. For example, the first content and the second content can be provisioned concurrently, as discussed herein.

At block 915, the network gateway selects a broadcast mode, a multicast mode, or unicast mode for delivery of the second content. The selection is performed based on the user context. For example, as discussed herein, personalized advertising content or other user-specific content can be transmitted to a single user in a unicast mode, content relevant to a geographic location can be broadcast to all user equipment within the geographic location, and content relevant to a particular group of users can be multicast to the group.

At block 920, the network gateway provides the second content in a second service flow. For example, the network gateway can provide the second content using an endpoint identifier to unicast the second content to the user equipment. For another example, the network gateway can provide the second content using a multicast group identifier to multicast the second content to a group including the user equipment. For yet another example, the network gateway can broadcast the second content.

Figure 10:
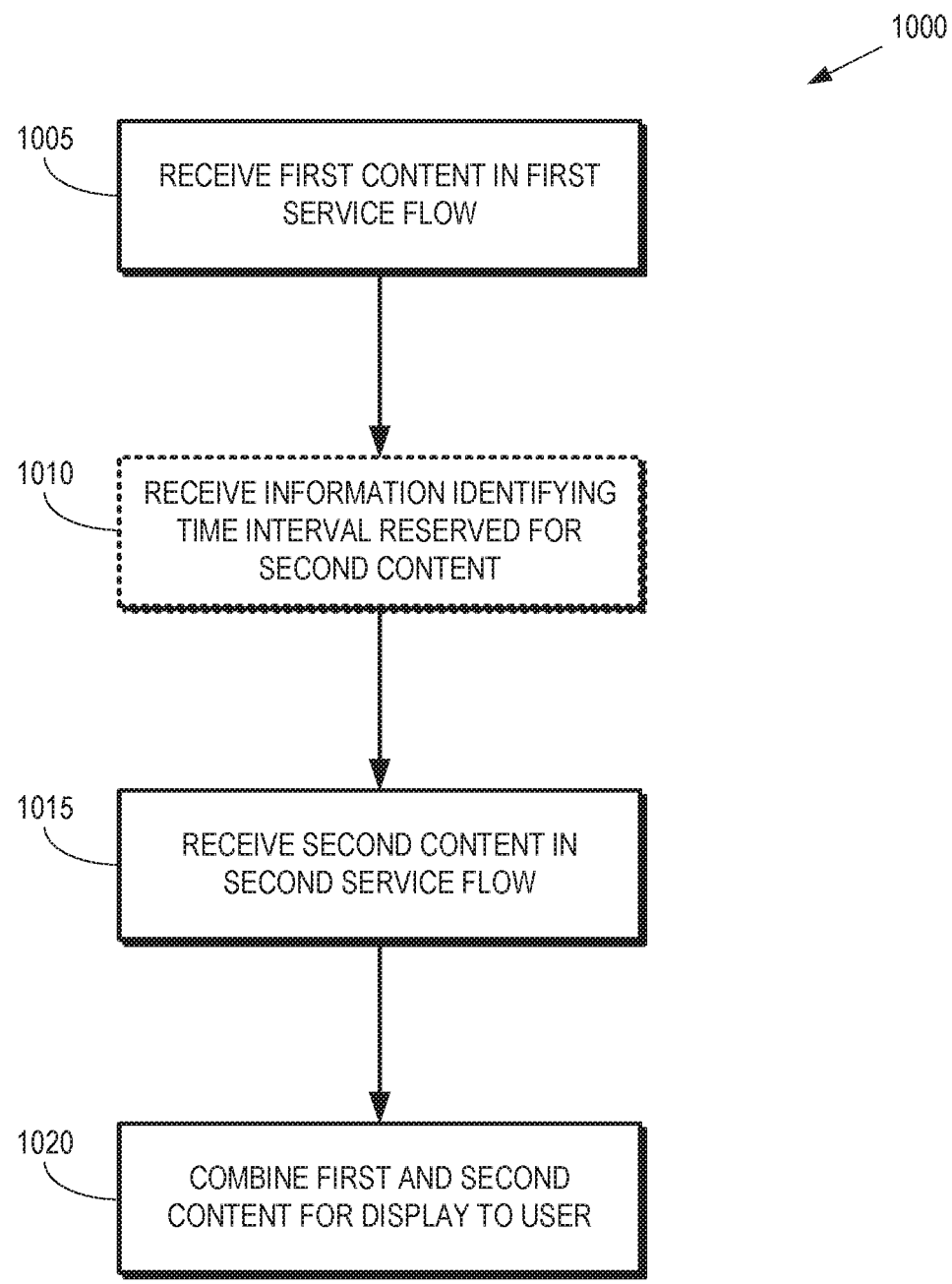
FIG. 10 is a flow diagram of a method for combining and displaying first and second content at a user equipment according to some embodiments.

FIG. 10 is a flow diagram of a method 1000 for combining and displaying first and second content at a user equipment according to some embodiments. The method 1000 is implemented in some embodiments of the user equipment 130 shown in FIG. 1, the user equipment 310-312 shown in FIG. 3, the user equipment 420 shown in FIG. 4, the user equipment 515-519 shown in FIG. 5, and the user equipment 600 shown in FIG. 6.

At block 1005, the user equipment receives first content in a first service flow. For example, the user equipment can receive multicast or broadcast content representative of a television program, a movie, or a live sporting event.

At block 1010, the user equipment can receive information identifying a time interval reserved for second content. Reception of the first content can be interrupted during the time interval so that the second content can be inserted and displayed by the user equipment. However, the block 1010 is optional and is not performed in all embodiments of the method 1000.

At block 1015, the user equipment receives the second content in a second service flow. The second content can be unicast to the user equipment, multicast to a multicast group that includes the user equipment, or broadcast throughout a geographical area that includes the user equipment.

At block 1020, the user equipment combines the first and second content for display. If the first content is interrupted for a reserve time interval, the user equipment inserts the second content into a display stream during the reserved time interval. Alternatively, the first content and the second content can be received concurrently, in which case the user equipment non-intrusively combines the first and second content, e.g., by using the second content to produce crawlers, running messages, diggers, and the like that overlay a portion of the image created using the first content.

Figure 11:
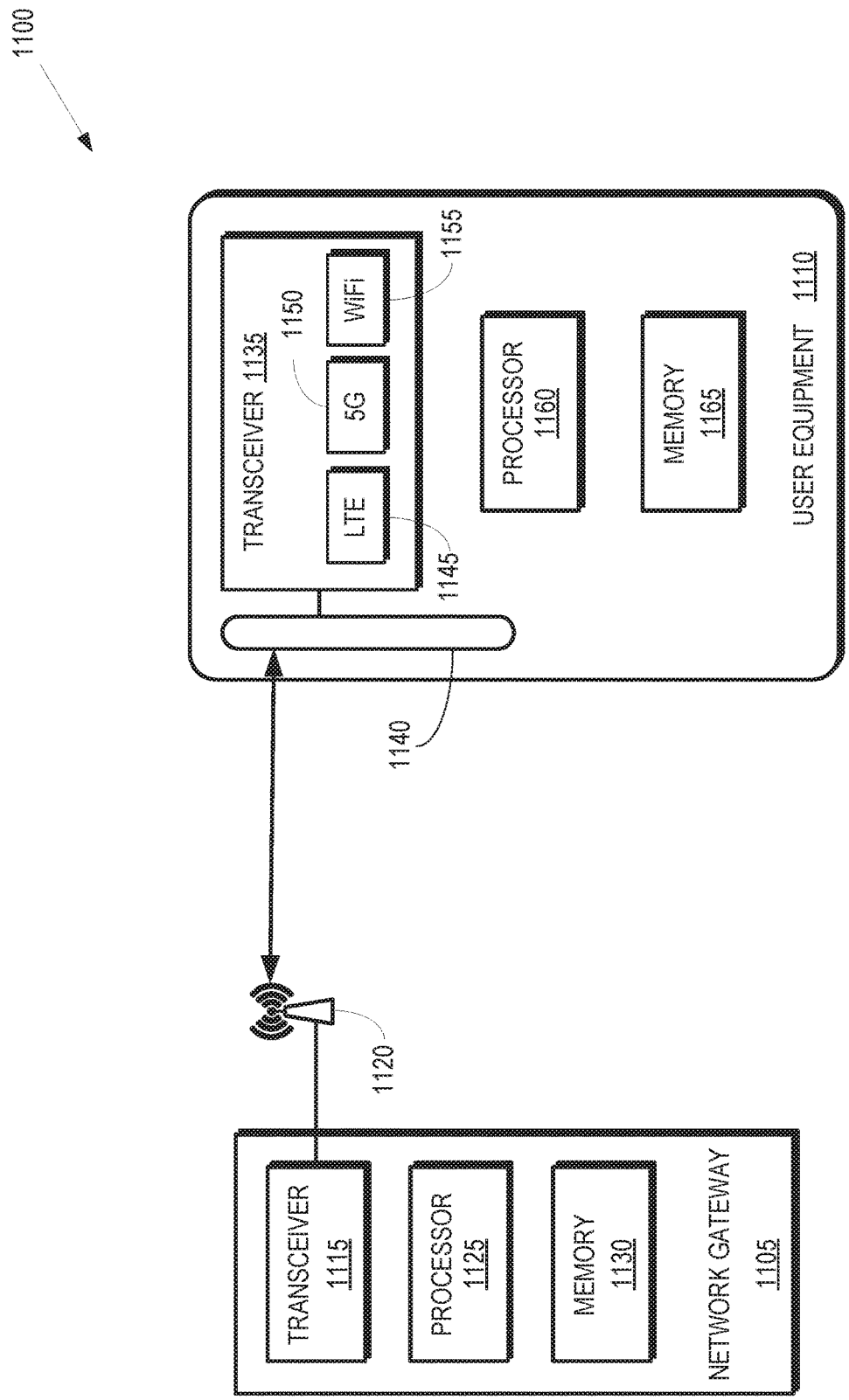
FIG. 11 is a block diagram of a fifth example of a communication system according to some embodiments.

FIG. 11 is a block diagram of a fifth example of a communication system 1100 according to some embodiments. The communication system 1100 includes a network gateway 1105 that selectively broadcast, multicast, or unicasts content to a user equipment 1110. Some embodiments of the network gateway 1105 may be used to implement the user plane function 120 shown in FIG. 1 or the MBMS gateway 320 shown in FIG. 3.

The network gateway 1105 includes a transceiver 1115 for transmitting and receiving signals. The transceiver 1115 can therefore be implemented as a transmitter and a receiver. For example, the network gateway 1105 provide content streams to a base station 1120, such as the base stations 135, 140, 155 shown in FIG. 1, the base stations 325, 340-342 shown in FIG. 3, or the base station 440 shown in FIG. 4. The network gateway 1105 can also provide content streams to fixed access network such as the residential gateway 145 shown in FIG. 1, the fixed network 330 shown in FIG. 3, and the fixed network 445 shown in FIG. 4. The network gateway 1105 also includes a processor 1125 and a memory 1130. The processor 1125 may be used to execute instructions stored in the memory 1130 and to store information in the memory 1130 such as the results of the executed instructions. Some embodiments of the processor 1125 and the memory 1130 are configured to perform portions of the method 800 shown in FIG. 8, the method 900 shown in FIG. 9, and the method 1000 shown in FIG. 10.

The user equipment 1110 includes a transceiver 1135 for transmitting and receiving signals via antenna 1140. The transceiver 1135 can therefore be implemented as a transmitter and a receiver. Some embodiments of the transceiver 1135 include multiple radios for communicating according to different radio access technologies such as a radio 1145 for communication according to LTE standards, a radio 1150 for communication according to 5G standards, and a radio 1155 for Wi-Fi communication. The transceiver 1135 can also be used to communicate via a fixed access network. The user equipment 1110 also includes a processor 1160 and a memory 1165. The processor 1160 may be used to execute instructions stored in the memory 1165 and to store information in the memory 1165 such as the results of the executed instructions. Some embodiments of the processor 1160 and the memory 1165 are configured to perform portions of the method 800 shown in FIG. 8, the method 900 shown in FIG. 9, and the method 1000 shown in FIG. 10.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
providing, from a network gateway, first content in a first service flow associated with a user equipment, wherein the first content is provided using a first transmission mode, and wherein the network gateway is an endpoint of service flows;
receiving, at the network gateway, packets from the user equipment;
extracting user-specific information from the packets;
generating a user context for the user equipment based on the user-specific information;
selecting, at the network gateway, a second transmission mode based on the user context for the user equipment; and
transmitting, from the network gateway, the first content in the first transmission mode concurrently with transmitting second content via the second transmission mode in a second service flow to the user equipment for combination with the first content.

2. The method of claim 1, wherein providing the first content in the first service flow using the first transmission mode comprises broadcasting or multicasting the first content to a plurality of user equipment that includes the user equipment.

3. The method of claim 1, further comprising:
interrupting provision of the first content in the first service flow for a predetermined time interval, and wherein transmitting the second content comprises transmitting the second content during the predetermined time interval via the second transmission mode.

4. The method of claim 1, wherein transmitting the second content via the second transmission mode comprises at least one of:
unicasting user-specific content to the user equipment;
multicasting a second advertisement to a subset of a plurality of user equipment; and
broadcasting a third advertisement to the plurality of user equipment.

5. The method of claim 1, further comprising:
selecting the second content from a set of content streams based on the user context.

6. The method of claim 1, wherein extracting the user-specific information comprises:
performing deep packet inspection on the packets received from the user equipment; and
generating the user context based on results of the deep packet inspection.

7. The method of claim 6, wherein generating the user context comprises generating the user context based on spatial or temporal information associated with the user equipment.

8. The method of claim 7, further comprising:
anonymizing the user context; and
providing the anonymized user context to a third party.

9. A method comprising:
receiving, at a receiver of a user equipment, first content from a network gateway in a first service flow, wherein the first content is received in a first transmission mode, and wherein the network gateway is an endpoint for service flows;
receiving, at the receiver of the user equipment concurrently with receiving the first content in the first transmission mode, second content in a second service flow that is transmitted from the network gateway via a second transmission mode that is selected based on a user context for the user equipment;

transmitting user-specific information in packets using towards the network gateway, wherein the user context is generated based on the user-specific information included in the packets transmitted by the user equipment; and combining, at a processor of the user equipment, the first content and the second content for display.

10. The method of claim 9, wherein the first transmission mode is a broadcast mode or a multicast mode.

11. The method of claim 9, wherein the first content in the first service flow is interrupted for a predetermined time interval, and wherein combining the first content and the second content comprises displaying the second content during the predetermined time interval.

12. The method of claim 9, wherein combining the first content and the second content comprises non-intrusively displaying the second content concurrently with displaying the first content.

13. The method of claim 9, further comprising:
installing, at the user equipment, at least one application configured to combine the first content and the second content for display.

14. The method of claim 9, further comprising:
providing, from the user equipment, spatial or temporal information associated with the user equipment, wherein the spatial or temporal information is used to generate the user context.

15. An apparatus comprising:
a transceiver configured to provide first content in a first service flow associated with a user equipment and receive packets from the user equipment, wherein the first content is provided in a first transmission mode, and wherein the transceiver is configured to receive packets from the user equipment; and
a processor configured to:
extract user-specific information from the packet;
generate a user context for the user equipment based on the user-specific information, and
select a second transmission mode for transmitting second content based on the user context for the user equipment, and
wherein the transceiver is configured to transmit the first content in the first transmission mode concurrently with transmitting, according to the second transmission mode, the second content to the user equipment in a second service flow for combination with the first content.

16. The apparatus of claim 15, wherein the first transmission mode is a broadcast mode or a multicast mode.

17. The apparatus of claim 15, wherein the transceiver is configured to interrupt provision of the first content in the first service flow in the first transmission mode for a predetermined time interval, and wherein the second transmission mode is a broadcast mode, a multicast mode, or a unicast mode that is used during the predetermined time interval.

18. The apparatus of claim 15, wherein the processor is configured to select at least one of:
unicasting user-specific content to the user equipment;
multicasting a second advertisement to a subset of a plurality of user equipment that includes the user equipment; and
broadcasting a third advertisement to the plurality of user equipment.

19. The apparatus of claim 15, wherein the processor is configured to select the second content from a set of content streams based on the user context.

20. The apparatus of claim 15, wherein the processor is configured to:
perform deep packet inspection on the packets received from the user equipment; and
generate the user context based on results of the deep packet inspection.

21. The apparatus of claim 20, wherein the processor is configured to generate the user context based on spatial or temporal information associated with the user equipment.

22. The apparatus of claim 21, wherein the processor is configured to anonymize the user context, and wherein the transceiver is configured to provide the anonymized user context to a third party.

23. An apparatus, comprising:
a transceiver configured to receive first content in a first service flow in a first transmission mode and concurrently with receiving second content in a second service flow that is transmitted via a second transmission mode that is selected based on a user context for the apparatus,
wherein the transceiver is configured to transmit packets towards a network gateway that is an endpoint for service flows, wherein the user context is generated based on user-specific information included in the packets transmitted by the apparatus; and
a processor configured to combine the first content and the second content for display.

24. The apparatus of claim 23, wherein the first transmission mode is a broadcast mode or a multicast mode.

25. The apparatus of claim 23, wherein the first content in the first service flow is interrupted for a predetermined time interval, and wherein the processor is configured to display the second content during the predetermined time interval.

26. The apparatus of claim 23, wherein the processor is configured to non-intrusively display the second content concurrently with display the first content.

27. The apparatus of claim 23, wherein the processor is configured to install at least one application configured to combine the first content and the second content for display.

28. The apparatus of claim 23, wherein the transceiver is configured to provide spatial or temporal information associated with the apparatus, wherein the spatial or temporal information is used to generate the user context.

\* \* \* \* \*